United States Patent
Weber et al.

(10) Patent No.: US 9,120,062 B2
(45) Date of Patent: Sep. 1, 2015

(54) HIGH PERFORMANCE POSITIVELY CHARGED COMPOSITE MEMBRANES AND THEIR USE IN NANOFILTRATION PROCESSES

(71) Applicants: BASF SE, Ludwigshafen (DE); National University of Singapore, Singapore (SG)

(72) Inventors: Martin Weber, Maikammer (DE); Christian Maletzko, Altrip (DE); Bernd Trotte, Hemsbach (DE); Peishan Zhong, Singapore (SG); Tai-Shung Chung, Ann Arbor, MI (US)

(73) Assignees: BASF SE, Ludwigshafen (DE); NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 13/866,498

(22) Filed: Apr. 19, 2013

(65) Prior Publication Data
US 2013/0306551 A1    Nov. 21, 2013

Related U.S. Application Data

(60) Provisional application No. 61/635,966, filed on Apr. 20, 2012.

(51) Int. Cl.
*C08G 8/02* (2006.01)
*B01D 71/68* (2006.01)
(Continued)

(52) U.S. Cl.
CPC .............. *B01D 71/68* (2013.01); *B01D 67/009* (2013.01); *B01D 67/0093* (2013.01); *B01D 69/125* (2013.01); *B01D 71/78* (2013.01); *B01D 61/027* (2013.01); *B01D 2323/345* (2013.01); *B01D 2323/385* (2013.01); *B01D 2325/16* (2013.01)

(58) Field of Classification Search
CPC ......... C08G 75/23; C08G 75/20; C08L 81/06
USPC ...................................... 528/125, 373, 370
See application file for complete search history.

(56) References Cited

U.S. PATENT DOCUMENTS 5,985,477 A * 11/1999 Iwasaki et al. ................ 429/493
6,780,327 B1    8/2004 Wu et al.
(Continued)

FOREIGN PATENT DOCUMENTS

CA    2325020 A1    10/1999
EP    1394879 A1    3/2004

OTHER PUBLICATIONS

Li, X., et al., "A novel postively charged nanofiltration membrane prepared from N,N-dimethylaminoethyl methacrylate by quaternization cross-linking", Journal of Membrane Science, vol. 374, (2011), pp. 33-42.

(Continued)

*Primary Examiner* — Shane Fang
(74) *Attorney, Agent, or Firm* — Drinker Biddle & Reath LLP (57) ABSTRACT

The present invention is directed to positively charged nanofiltration (NF) membranes comprising a substrate layer (S) based on a sulfonated polymer and a positively charged film layer (F) on top of said substrate, and to a method for their preparation. Furthermore, the present invention is directed to nanofiltration processes making use of said composite membrane.

21 Claims, 3 Drawing Sheets

(51) Int. Cl.
  *B01D 67/00* (2006.01)
  *B01D 69/12* (2006.01)
  *B01D 71/78* (2006.01)
  *B01D 61/02* (2006.01)

(56) References Cited

U.S. PATENT DOCUMENTS

| | | |
|---|---|---|
| 2007/0163951 A1* | 7/2007 | McGrath et al. ......... 210/500.41 |
| 2010/0326833 A1 | 12/2010 | Messalem et al. |
| 2011/0294912 A1 | 12/2011 | Weber et al. |
| 2012/0181487 A1 | 7/2012 | Gibon et al. |
| 2012/0253232 A1 | 10/2012 | Minakuchi et al. |
| 2012/0253233 A1 | 10/2012 | Greene et al. |
| 2012/0273423 A1 | 11/2012 | Weber et al. |
| 2012/0296028 A1 | 11/2012 | Weber et al. |
| 2012/0309889 A1 | 12/2012 | Weber et al. |
| 2012/0329919 A1 | 12/2012 | Weber et al. |
| 2013/0035457 A1 | 2/2013 | Weber et al. |
| 2013/0059933 A1 | 3/2013 | Ruckdaschel et al. |
| 2013/0085224 A1 | 4/2013 | Weber et al. |
| 2013/0176565 A1 | 7/2013 | Meade et al. |
| 2013/0255785 A1 | 10/2013 | Schmid et al. |
| 2013/0277318 A1 | 10/2013 | Weber et al. |
| 2014/0017427 A1 | 1/2014 | Mettlach et al. |

OTHER PUBLICATIONS

Pieracci, J., et al., "UV-Assisted Graft Polymerication of N-vinyl-2-pyrrolidinone onto Poly(ether sulfone) Ultrafiltration Membranes: Comparison of Dip versus Immersion Modification Techniques", Chem. Mater., vol. 12, (2000), pp. 2123-2133.

Santafé-Moros, A., et al., "Performance of commerical nanofiltration memranes in the removal of nitrate ions", Desalination, vol. 185, (2005), pp. 281-287.

Smolders, C., et al., "Microstructures in phase-inversion membranes. Part 1. Formation of macrovoids", Journal of Membrane Science, vol. 73, (1992), pp. 259-275.

Stanton, B., et al., "Ultrathin Multilayered Polyelectrolyte Films as Nanofiltration Membranes", Langmuir, vol. 19, (2003), pp. 7038-7042.

Ueda, M., et al., "Synthesis and Characterization of Aromatic Poly (ether Sulfone) s Containing Pendant Sodium Sulfonate Groups", J. Polym. Sci. A, Polym. Chem. vol. 31, No. 4, (1993), pp. 853-856.

Ulbricht, M., et al., "Novel high performance photo-graft composite membranes for separation of organic liquids by pervaporation", Journal of Membrane Science, vol. 136, (1997), pp. 25-33.

Van der Bruggen, B., et al., "A Review of Pressure-Driven Membrane Processes in Wastewater Treatment and Drinking Water Production", Environmental Process, vol. 22, No. 1, (2003), pp. 46-56.

Wang, K., et al., "The characterization of flat composite nanofiltration membranes and their applications in the separation of Cephalexin", Journal of Membrane Science, vol. 247, (2005), pp. 37-50.

Yamagishi, H., et al., "Development of a novel photochemical technique for modifying poly(arylsulfone) ultrafiltration memrbanes", Journal of Membrane Science, vol. 105, (1995), pp. 237-247.

Béquet, S., et al., "From ultrafiltration to nanofiltration hollow fiber membranes: a continuous UV-photografting process", Desalination, vol. 144, (2002), pp. 9-14.

Dey, T., et al., "Development, Characterization and Performance Evaluation of Postively-Charged Thin Film-Composite Nanofiltration Membrane Containing Fixed Quaternary Ammonium Moieties", Separation Science and Technology, vol. 46, (2011), pp. 933-943.

Geise, G., et al., "Water Purification by Membranes: The Role of Polymer Science", J. Poly. Sci, Part B, Polym Phys., vol. 48, (2010), pp. 1685-1718.

Harrison, W., et al., "Influence of Bisphenol Structure on the Direct Synthesis of Sulfonated Poly(Arylene Ether)s", Polymer Preprints, vol. 41, No. 2, (2000), pp. 1239-1240.

Hilal, N., et al., "A comprehensive review of nanofiltration membranes: Treatement, pretreatement, modelling, and atomic force microscopy", Desalination, vol. 170, (2004), pp. 281-308.

Huang, R., et al., "Postively charged composite nanofiltration memrane from quaternized chitosan by toluene diisocyanate crosslinking", Separation and Purification Technology, vol. 61, (2008), pp. 424-429.

Johnson, R., et al., "Poly(aryl Ethers) by Nucleophilic Aromatic Substitution. I. Synthesis and Properties", Journal of Polymer Science: Part A-1, vol. 5, (1967), pp. 2375-2398.

Ouyang, L., et al., "Multilayer polyelectrolyte films as nanofiltration memrbanes for sperating monovalent and divalent cations", Journal of Membrane Science, vol. 310, (2008), pp. 76-84.

Seman, M., et al., "Reduction of nanofiltration membrane fouling by UV-initiated graft polymerization technique", Journal of Memrbane Science, vol. 355, (2010), pp. 133-141.

Deng, H., et al. "High flux positively charged nanofiltration membranes prepared by UV-initiated graft polymerization of methacrylatoethyl trimethyl ammonium chloride (DMC) onto polysulfone membranes", Journal of Membrane Science, Elsevier Scientific Publ. Co., Amsterdam, NL, vol. 366, No. 1-2, (2011) pp. 363-372, XP027525118, ISSN: 0376-7388.

International Search Report for PCT/EP2013/058170 mailed Jun. 28, 2013.

* cited by examiner

| Membrane ID | Safranin O Rejection (%) MW: 350.84 Da Charge: (+) | Orange II Rejection (%) MW: 350.32 Charge: (-) |
|---|---|---|
| Typical dye separation before and after passing the NF1 membranes | | |
| Typical dye separation before and after passing the NF2 membranes | | |
| The typical NF membranes after used for dye separations | | |
| NF1 | 99.60 ± 0.02 | 59.67 ± 3.29 |
| NF2 | 99.98 ± 0.02 | 86.76 ± 2.52 |

Fig. 4

HIGH PERFORMANCE POSITIVELY CHARGED COMPOSITE MEMBRANES AND THEIR USE IN NANOFILTRATION PROCESSES

CROSS-REFERENCE TO RELATED APPLICATIONS

This application claims benefit (under 35 USC 119(e)) of U.S. Provisional Application 61/635,966, filed Apr. 20, 2012, which is incorporated by reference The present invention is directed to positively charged nanofiltration (NF) membranes comprising a substrate layer (S) based on a sulfonated polymer and a positively charged film layer (F) on top of said substrate, and to a method for their preparation. Furthermore, the present invention is directed to nanofiltration processes making use of said composite membrane.

BACKGROUND OF THE INVENTION

Nanofiltration (NF) is a pressure-driven technique that is gaining popularity due to its low consumption of energy, high water permeability and retention of multivalent ions as compared to the well-established reverse osmosis process [1, 2]. Such membranes have been researched for the application in many areas such as pre-treatment for the desalination process and have shown to be able to remove turbidity, microorganisms and dissolved salts [3].

A NF membrane usually consists of a thin active layer supported by a porous sublayer or substrate layer. This active layer plays the determining role in permeation and separation characteristics while the porous sublayer imparts the mechanical strength. There are many approaches to fabricate this active layer, namely:
(1) interfacial polymerization [6],
(2) layer-by-layer assembly [7, 8],
(3) chemical crosslinking [9] and
(4) UV grafting [10].

Among these approaches, UV grafting has been applied for years due to its advantages such as ease of operation and low cost [11, 12]. In addition, the fabrication via UV grafting produces an integral selective layer due to a strong chemical bond to the substrate which provides sufficient mechanical stability under relatively high operating pressure.

It has been known that polyethersulfone (PESU) can generate free radicals upon exposure to UV light due its photosensitive nature [13]. Thus, vinyl monomers in contact with free radicals can form a covalent bond with PESU.

The separation behaviour of NF membranes comprises size exclusion as well as electrostatic repulsion [4]. Thus, for the removal of cationic compounds, the use of a positively charged membrane is more effective than a negatively charged one. However, commercially available NF membranes are mostly negatively charged [5]. Hence, problem of the present invention is to provide positively charged NF membranes in order to improve performance in this area of separation.

SUMMARY OF THE INVENTION

The above problem is, in particular, solved by providing a new material, sulphonated polyphenylenesulfone (sPPSU) which was selected as the substrate for NF membrane fabrications via similar UV grafting technique.

A preferred substrate for use in the preparation of NF membranes is a polymer, designated sPPSU 2.5%, because of its hydrophilic nature and balanced mechanical strength. The polymer is made up of 97.5 mol % of the repeating unit of formula (1), in particular (1a) and 2.5 mol % of the sulphonated repeating unit (2), in particular (2a), as depicted below.

DETAILED DESCRIPTION OF THE INVENTION

A. General Definitions

"Membranes for water treatment" are generally semi-permeable membranes which allow for separation of dissolved and suspended particles of water, wherein the separation process itself can be either pressure-driven or electrically driven.

Examples of membrane application are pressure-driven membrane technologies such as microfiltration (MF; pore size about 0.08 to 2 μm, for separation of very small, suspended particles, colloids, bacteria), ultrafiltration (UF; pore size about 0.005 to 0.2 μm; for separation of organic particles>1000 MW, viruses, bacteria, colloids), nanofiltration (NF, pore size 0.001 to 0.01 μm, for separation of organic particles>300 MW Trihalomethan (THM) precursors, viruses, bacteria, colloids, dissolved solids) or reverse osmosis (RO, pore size 0.0001 to 0.001 μm, for separation of ions, organic substances>100 MW).

Molecular weights of polymers are, unless otherwise stated as Mw values, in particular determined via GPC in DMAc. In particular, the GPC measurements were performed with dimethylacetamide (DMAc) containing 0.5 wt-% lithium bromide. Polyester copolymers were used as column material. The calibration of the columns was performed with narrowly distributed PMMA standards. As flow rate 1 ml/min was selected, the concentration of the injected polymer solution was 4 mg/ml.

A "sulfonated" molecule carries at least one sulfo residue of the type —$SO_3H$, or the corresponding metal salt form thereof of the type —$SO_3^-M^+$, like an alkali meta salt form with M=Na, K or Li.

"Partially sulfonated" in the context of the present invention refers to a polymer, wherein merely a certain proportion of the monomeric constituents is sulfonated and contains at least one sulfo group residue. In particular about 0.5 to 5 mol-%, 0.8 to 4.5 mol-% or about 1 to 3.5 mol-% of the monomeric constituents or repeating units of the polymer carry at least one sulfo group. The sulfonated monomeric unit may carry one or more, as for example 2, 3, 4, in particular 2 sulfo groups. If the sulfo content is below 0.5 mol.-% then no improvement of the hydrophilicity can be seen; if the sulfo content is above 5 mol.-% then a membrane with macrovoids and low mechanical stability is obtained.

"Arylene" represents bivalent, mono- or polynucleated, in particular mono-, di- or tri-nucleated aromatic ring groups which optionally may be mono- or poly-substituted, as for example mono-, di- or tri-substituted, as for example by same or different, in particular same lower alkyl, as for example $C_1$-$C_8$ or $C_1$-$C_4$ alkyl groups, and contain 6 to 20, as for example 6 to 12 ring carbon atoms. Two or more ring groups may be condensed or, more preferably non-condensed rings, or two neighboured rings may be linked via a group R selected from a C—C single bond or an ether (—O—) or an alkylene bridge, or halogenated alkylene bridge or sulfono group (—SO$_2$—). Arylene groups may, for example, be selected from mono-, di- and tri-nucleated aromatic ring groups, wherein, in the case of di- and tri-nucleated groups the aromatic rings are optionally condensed; if said two or three aromatic rings are not condensed, then they are linked pairwise via a C—C-single bond, —O—, or an alkylene or halogenated alkylene bridge. As examples may be mentioned: phenylenes, like hydroquinone; bisphenylenes; naphthylenes; phenanthrylenes as depicted below:

wherein R represents a linking group as defined above like —O—, alkylene, or fluorinated or chlorinated alkylene or a chemical bond and which may be further substituted as defined above.

"Alkylene" represents a linear or branched divalent hydrocarbon group having 1 to 10 or 1 to 4 carbon atoms, as for example $C_1$-$C_4$-alkylene groups, like —CH$_2$—, —(CH$_2$)$_2$—, (CH$_2$)$_3$—, —(CH$_2$)$_4$—, —(CH$_2$)$_2$—CH(CH$_3$)—, —CH$_2$—CH(CH$_3$)—CH$_2$—, (CH$_2$)$_4$—.

"Lower alkyl" represents an "alkyl" residue which is linear or branched having from 1 to 8 carbon atoms. Examples thereof are: $C_1$-$C_4$-alkyl radicals selected from methyl, ethyl, n-propyl, isopropyl, n-butyl, 2-butyl, isobutyl or tert-butyl, or $C_1$-$C_6$-alkyl radicals selected from $C_1$-$C_4$-alkyl radicals as defined above and additionally pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl.

"Vinyl" has to be understood broadly and encompasses polymerizable monovalent residues of the type C═C—, as for example H$_2$C═CH— or H$_2$C═C(methyl)-.

An "asymmetric membrane" (or anisotropic membrane) has a thin porous or nonporous selective barrier, supported by a much thicker porous substructure (see also H. Susanto, M. Ulbricht, Membrane Operations, Innovative Separations and Transformations, ed. E. Driolo, L. Giorno, Wiley-VCH-Verlag GmbH, Weinheim, 2009, p. 21)

B. Particular Embodiments

The present invention provides the following particular embodiments:

1. A composite membrane, particularly useful as NF membrane, comprising
   a) at least one sponge-like, macrovoid free substrate layer (S) comprising at least one hydrophilic partially sulfonated polyethersulfone polymer (P1), carrying
   b) at least one selective film layer (F) comprising at least one cationic polymer (P2) associated with said at least substrate layer (S).
2. The composite membrane of embodiment 1, wherein said at least one cationic polymeric film layer (F) is grafted, in particular UV-grafted, on said at least one sponge-like substrate layer (S).
3. The composite membrane of one of the preceding embodiments wherein said partially sulfonated polyethersulfone polymer (P1) is a polyaryleneethersulfone polymer and is composed of monomeric units of the general formulae wherein Ar represents a divalent aromatic (or arylene) residue,
as for example the M1 monomer:

as for example the M2 Monomer:

wherein at least one monomeric unit selected from M1 and M2 is sulphonated, and wherein the aromatic rings of M1 and/or M2 may further carry one or more same or different substituents (different from sulfo residues of the type —SO$_3$H, or the corresponding metal salt form thereof of the type —SO$_3^-$M$^+$), in particular those suitable for improving the feature profile (like mechanical strength, or permeability) of said substrate layer. Suitable substituents may be lower alky substituents, like methyl or ethyl.

4. The composite membrane of one of the preceding embodiments, wherein said partially sulfonated polyethersulfone polymer (P1) is obtainable by
   a) polymerizing non-sulfonated monomers of the general formulae M1a and M2a

-continued (M2a)

wherein Ar is as defined above, and
Hal is F, Cl, Br or J
as for example the M1a monomer:

and as for example the M2a Monomer:

and wherein the aromatic rings of M1a and/or M2a may further carry one or more substituents as described above for M1 and M2;
followed by sulphonating the obtained polymer, wherein sulphonation is controlled such that about 0.5 to 5 mol-%, 0.8 to 4.5 mol-% or 1 to 3.5 mol-% of the monomeric constituents of the polymer carry at least one sulfo group.
b) polymerizing monomers of the general formulae M1a and M2a and at least one sulphonated monomer of the general formulae M1b and M2b (M1b)

(M2b)

wherein Ar and Hal are as defined above, and n and m independently are 0, 1 or 2, provided that n and m are not simultaneously 0;
as for example the M1b monomer:

and as for example the M2b Monomer:

like

-continued and wherein the aromatic rings of M1b and/or M2b may further carry one or more substituents as described above for M1 and M2, and in particular wherein the molar proportion of sulfonated monomers M1b and/or M2b is in the range of 0.5 to 5 mol-% based on the total mole number of M1a, M1b, M2a and M2b. and wherein the molar ratio of (M1a+M1b):(M2a+M2b) is about 0.95 to 1.05, in particular 0.97 to 1.03.

5. The composite membrane of one of the preceding embodiments, wherein said partially sulfonated polyethersulfone polymer (P1) is a block copolymer or statistical copolymer.

6. The composite membrane of one of the preceding embodiments, wherein said partially sulfonated polyethersulfone polymer (P1) comprises
a non-sulfonated repeating unit of formula (1)

(1)

and a sulfonated repeating unit of formula (2)

(2)

7. The composite membrane of embodiment 3 wherein said partially sulfonated polyethersulfone polymer (P1) comprises
a non-sulfonated repeating unit of formula (1a)

(1a)

and sulfonated repeating unit of formula (2a)

(2a)

8. The composite membrane of embodiment 6 or 7, wherein said sulfonated repeating unit 2a is contained in a molar ratio of 0.1 to 20, 0.2 to 10, in particular 0.5 to 5 or 1 to 3.5 mol % based on the total mole number of repeating units (1) and (2) or (1a) and (2a), respectively.
9. The composite membrane of anyone of the preceding embodiments, wherein the cationic polymer (P2) is prepared from monomer constituents, comprising a positively charged monomer, selected from [2-(acryloyloxy)ethyl]trimethyl ammonium salts, [3-(methacryloylamino)propyl]trimethylammonium salts, [3-acrylamidopropyl]-trimethylammonium salts, trimethylvinylammonium hydroxide, 3-butene-1-ammonium salts, the family of ammonium salts with positive charge and at least one vinyl group, the family of phosphonium salts with at least one vinyl group and vinylimidazolium salts, wherein said salts independently of each other are halogenide salts, like fluorides, bromides, and, in particular, chlorides,
10. The composite membrane of one of the preceding embodiments, wherein said polymer (P1) has a Mw in the range of 50.000 to 150.000, in particular 70.000 to 100.000 g/mol, as determined by GPC in DMAc. If the Mw is above 150.000 then the solution viscosity of the polymer it too high. If the Mw is below 50.000, then the obtained membrane show limited mechanical strength.
11. The composite membrane of one of the preceding embodiments, wherein said polymer (P2) has a Mw in the range of 40.000 to 150.000, in particular 60.000 to 130.000 g/mol, as determined by GPC in DMAc. If the Mw is above 150.000 then the solution viscosity of the polymer is too high. If the Mw is below 40.000, then the obtained membranes show limited mechanical strength.
12. The composite membrane of anyone of the preceding embodiments, wherein the at least one substrate layer (S) represents a (fully) sponge-like and macrovoid-free structure.
13. The composite membrane of anyone of the preceding embodiments, wherein the film layer (F) on top of the substrate layer (S) has a layer thickness in the range of 100 to 500, 150 to 350 or 180 to 250 nm. If the layer thickness is above 500 nm then the permeability of the membrane is low, if the layer thickness is below 100 nm, then defects may reduce the selectivity.
14. The composite membrane of anyone of the preceding embodiments, wherein the substrate layer (S) has a layer thicknesses in the range of 30 to 400, 50 to 250 or 80 to 150 μm. If the layer thickness is above 400 μm then the permeability of the membrane is low, if the layer thickness is below 30 μm, then defects may reduce the selectivity.
15. The composite membrane of anyone of the preceding embodiments, wherein the sulphonated polymer (P1) is prepared from a monomer mixture comprising already sulfonated monomers of the type M1b
16. A method of preparing a composite membrane of any one of the preceding embodiments, which method comprises
  a) providing at least one substrate layer (S) comprising at least one partially sulfonated polyethersulfone polymer (P1),
  and
  b) grafting at least one film layer (F) comprising at least one cationic polymer (P2) on said at least one substrate layer (S).
17. The method of embodiment 16, wherein grafting is performed by a method, comprising
  b1) contacting said at least one substrate layer (S) with an aqueous solution containing at least one positively charged polymerizable monomer having at least one vinyl group, preferably contained in said aqueous solution in a concentration of 0.5 to 5 M, preferably for a period of time in the range of 1 to 30 minute;
  b2) removing excessive monomer solution; and
  b3) subjecting the thus prepared, wetted substrate layer (S) to UV radiation, suitable for providing a polymer of desired quality, preferably for a period of time in the range of in the range of 1 to 60, like 5 to 30 minutes,
18. The method of embodiment 17, wherein the wetted substrate layer (S) is exposed to UV radiation in vacuo.
19. The method of anyone of the preceding embodiments 16 to 18, wherein the at least one substrate layer (S) is prepared by applying a polymer solution comprising at least one partially sulphonated polyethersulfone polymer (P1) as defined in anyone of the embodiments 1 to 8.
20. The method of embodiment 19, wherein the polymer content of said solution is in the range of 10 to 40, 12 to 30 or 16 to 24 wt.-%. If the polymer content is above said range, then the solution viscosity of the dope solution is too high for spinning processes and if it is below said range, then the membrane formation occurs too slow for fibre spinning.
21. The method of embodiment 20, wherein the polymer solution contains at least one solvent selected from N-methylpyrrolidone (NMP), N-dimethylacetamide (DMAc), dimethylsulfoxide (DMSO), dimethylformamide (DMF), triethylphosphate, tetrahydrofuran (THF), 1,4-dioxane, methyl ethyl ketone (MEK), or a combination thereof; and, additionally may contain at least one further additive selected from ethylene glycol, diethylene glycol, polyethylene glycol, glycerol, methanol, ethanol, isopropanol, polyvinylpyrrolidone, or a combination thereof, wherein said additive is contained in said polymer solution in a range of 0 to 30 or 1 to 25 or 5 to 15 wt.-% per total weight of the polymer solution.
22. The method of anyone of the embodiments 19 to 21, wherein the at least one substrate layer (S) is prepared by applying a phase inversion method using water as a coagulant bath.
23. The method of embodiment 22, wherein water optionally in admixture with at least one lower alcohol, in particular methanol, ethanol, isopropanol, and optionally in admixture with at least one solvent as defined in embodiment 21 is applied as coagulant.
24. A nanofiltration membrane comprising at least one composite membrane of anyone of the embodiments 1 to 15 or prepared according to anyone of the embodiments 16 to 23.
25. The nanofiltration membrane of embodiment 24 in the form of a flat sheet, hollow fiber or tubule.
26. A nanofiltration method making use of a membrane of embodiment 24 or 25.
27. The method of embodiment 26 applied for treatment of water, and in particular removal or isolation of metal ions, textile dyes, low molecular weight or high molecular weight molecules from and a liquid, preferably aqueous phase.

C. Further Embodiment of the Invention

The manufacture of membranes such as NF membranes and their use in filtration modules of different configuration is known in the art. See for example [17] M C Porter et al. in Handbook of Industrial Membrane Technology (William Andrew Publishing/Noyes, 1990).

1. Preparation of Hydrophilic Membrane Substrate Layer (S)

1.1 Preparation of Polymer P1

Unless otherwise stated, preparation of polymers is generally performed by applying standard methods of polymer technology. In general, the reagents and monomeric constituents as used herein are either commercially available or well known from the prior art or easily accessible to a skilled reader via disclosure of the prior art.

1.1.1 Copolymerization of Non-Sulfonated Monomers Followed by Sulphonation of the Polymer According to a first particular embodiment the partially sulfonated polyaryleneether sulfone polymer P1 is produced stepwise by reacting non-sulfonated constituents of the type M1a and M2a and subsequently sulfonating the thus prepared polymer compound in a second step.

In general, the non-sulfonated polyaryleneether sulfone polymer P1 can be synthesized, for example by reacting a dialkali metal salt of an aromatic diol and an aromatic dihalide as taught, for example by [18] R. N. Johnson et al., J. Polym. Sci. A-1, Vol. 5, 2375 (1967).

Examples of suitable aromatic dihalides (M1a) include: bis(4-chlorophenyl)sulfone, bis(4-fluorophenyl)sulfone, bis(4-bromophenyl)sulfone, bis(4-iodophenyl)sulfone, bis(2-chlorophenyl)sulfone, bis(2-fluorophenyl)sulfone, bis(2-methyl-4-chlorophenyl)sulfone, bis(2-methyl-4-fluorophenyl)sulfone, bis(3,5-dimethyl-4-chlorophenyl)sulfone, bis(3,5-dimethyl-4-flurophenyl)sulfone and corresponding lower alkyl substituted analogs thereof. They may be used either individually or as a combination of two or more monomeric constituents thereof. Particular examples of dihalides are bis(4-chlorophenyl)sulfone (also designated (4,4'-dichlorophenyl)sulfone; DCDPS) and bis(4-fluorophenyl)sulfone.

Examples of suitable dihydric aromatic alcohols (M2a) which are to react with the aromatic dihalide are: hydroquinone, resorcinol, 1,5-dihydroxynaphthalene, 1,6-dihydroxynaphthalene, 1,7-dihydroxynaphthalene, 2,7-dihydroxynaphthalene, 4,4'-bisphenol, 2,2'-bisphenol, bis(4-hydroxyphenyl)ether, bis(2-hydroxyphenyl)ether, 2,2-bis(4-hydroxyphenyl)propane, 2,2-bis(3-methyl-4-hydroxyphenyl)propane, 2,2-bis(3,5-dimethyl-4-hydroyphenyl)propane, bis(4-hydroxyphenyl)methane, and 2,2-bis(3,5-dimethyl-4-hydroxypenyl)hexafluoropropane. Preferred of them are hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, bis(4-hydroxyphenyl)ether, and bis(2-hydroxyphenyl)ether. They may be used either individually or as a combination of two or more monomeric constituents M2a. Particular examples of such dihydric aromatic alcohols are 4,4'-bisphenol and 2,2'-bisphenol.

The dialkali metal salt of said dihydric aromatic phenol is obtainable by the reaction between the dihydric aromatic alcohol and an alkali metal compound, such as potassium carbonate, potassium hydroxide, sodium carbonate or sodium hydroxide.

The reaction between the dihydric aromatic alcohol dialkali metal salt and the aromatic dihalide is carried out as described in the art (see for example [19] Harrison et al, Polymer preprints (2000) 41 (2) 1239). For example a in a polar solvent such as dimethyl sulfoxide, sulfolane, N-methyl-2-pyrrolidone, 1,3-dimethyl-2-imidazolidinone, N,N-dimethylformamide, N,N-dimethylacetamide, and diphenyl sulfone, or mixtures thereof or mixtures of such polar solvents with apolar organic solvents like toluene may be applied.

The reaction temperature is typically in the range of 140 to 320° C., preferentially 160 to 250° C. The reaction time may be in the range of 0.5 to 100 h, preferentially 2 to 15 h.

The use of either one of the dihydric aromatic alcohol alkali metal salt and the aromatic dihalide in excess results in the formation of end groups that can be utilized for molecular weight control. Otherwise, if the two constituents are used in equimolar amounts, and either one of a monohydric phenol, as for example, phenol, cresol, 4-phenylphenol or 3-phenylphenol, and an aromatic halide, as for example 4-chlorophenyl sulfone, 1-chloro-4-nitrobenzene, 1-chloro-2-nitrobenzene, 1-chloro-3-nitrobenzene, 4-fluorobenzophenone, 1-fluoro-4-nitrobenzene, 1-fluoro-2-nitrobenzene or 1-fluoro-3-nitrobenzene is added for chain termination.

The degree of polymerization (calculated on the basis of repeating units composed of one monomer (M1) and one monomer (M2), as for example repeating units (1) and (2) or (1a) and (2a)) of the thus obtained polymer may be in the range of 40 to 120, in particular 50 to 80 or 55 to 75.

In a next step the thus obtained non-sulfonated polymer P1 may be subjected to direct sulfonation by applying methods described in the prior art (see for example EP 1394879 and prior art documents cross-referenced therein). In particular, sulfonation may be achieved with well-known sulfonating agents, such as sulphuric acid, as for example 90 to 98% concentrated sulphuric acid, and under mild temperatures as for example room temperature or temperatures in the range of 20 to 50° C. and over a period of time of 1 to 100 h.

The degree of sulfonation may be controlled via amount of charged sulfonating agent and should be in the range of 1 to 5 mol-% sulfonated units 1.1.2 Copolymerization with Already Sulfonated Monomeric Constituents In a second embodiment of the method of preparing said at least partially sulfonated polyethersulfone polymer P1 of the present invention a one step polymerization process is applied.

According to this approach a mixture of non-sulfonated monomers M1a and M2a as described above and at least one sulfonated monomer of the type M1b and M2b is polymerized.

Compounds M1b and M2b are the mono- or poly-sulfonated equivalents of the above-described non-sulfonated monomeric constituents M1a and M1b. Such sulfonated monomeric constituents are either well-known in the art or easily accessible via routine methods of organic synthesis. For example sulfonated aromatic dihalides, such as sodium 5,5'-sulphonyl bis(2-chlorobenzenesulfonate) (the 5,5'-bis sulfonated analog of DCDPS) are, for example, disclosed by [20] M. Ueda et al., J. Polym. Sci., Part A: Polym. Chem. Vol. 31 853 (1993).

Reaction of the monomeric constituents, in particular, of the aromatic dihalides M1a and M1b and the dihydric aromatic alcohol alkali metal salts of M2a and optionally M2b is performed as described above. Control of molecular weight is also achieved in the above-described manner or may also be performed as described [21] Geise, G. M., et al J. Poly. Sci, Part B: Polym Phys.: Vol 48, (2010), 1685 and literature cross-referenced therein.

1.2 Preparation of Substrate Layer (S)

Preparation of the sponge-like, macrovoid free substrate layer (S) is performed by applying well-known techniques of membrane formation, as for example described in [22] C. A. Smolders et al J. Membr. Sci.: Vol 73, (1992), 259.

A particular method of preparation is known as phase separation method.

In a first step the partially sulfonated polymer (P1) as prepared above is dried, as for example at a temperature in the range of 20 to 80, as for example 60° C. under vacuum in order to remove excess liquid.

In a second step a homogeneous dope solution comprising the polymer in a suitable solvent system is prepared. Said solvent system contains at least one solvent selected from N-methylpyrrolidone (NMP), N-dimethylacetamide (DMAc), dimethylsulfoxide (DMSO), dimethylformamide (DMF), triethylphosphate, tetrahydrofuran (THF), 1,4-dioxane, methyl ethyl ketone (MEK), or a combination thereof; and, additionally may contain at least one further additive selected from ethylene glycol, diethylene glycol, polyethylene glycol, glycerol, methanol, ethanol, isopropanol, polyvinylpyrrolidone, or a combination thereof, wherein said additive is contained in said polymer solution in a range of 0-50, like 0-30 wt.-% per total weight of the polymer solution.

The polymer content is in the range of 10 to 40, or 16 to 24 wt.-% based on the total weight of the solution. For example a typical composition comprises sPPSU 2.5%/ethylene glycol/N-methyl pyrrolidone (NMP>99.5%) in a wt %-ratio of 20:16:64.

In a third step, the polymer solution is then cast on a solid support, as for example glass plate using a casting knife suitably of applying a polymer layer of sufficient thickness.

Immediately afterwards, in a fourth step, the polymer layer provided on said support is immersed in a coagulant bath, containing a water-based coagulation liquid, e.g. a tap water coagulant bath. Optionally, water may be applied in admixture with at least one lower alcohol as coagulant bath, in particular methanol, ethanol, isopropanol, and optionally in admixture with at least one solvent as defined above. The as-cast membranes were soaked in water for at least 2 days with constant change of water to ensure complete removal of solvent in order to induce phase inversion.

As a result of this procedure a membrane substrate exhibiting a sponge-like structure with no macrovoids is obtained.

2. Preparation of a NF Membrane Carrying a Cationic Film Layer (F)

For preparing a composite membrane suitable for NF applications, the substrate (S) is further modified by grafting a polymeric cationic film layer (F) onto its surface. For this purpose said polyethersulfone-based substrate layer (S) layer is photosensitized to form free radicals which then may initiate radical polymerisation of cationic monomers which are brought into contact with said photosensitized layer.

In particular, said film layer (F) may comprise a cationic polymer (P2) which is prepared by radical polymerization from positively charged monomers carrying at least one vinyl group, selected from [2-(acryloyloxy)ethyl]trimethyl ammonium salts, [3-(methacryloylamino)propyl]trimethylammonium salts, [3-acrylamidopropyl]-trimethylammonium salts, trimethylvinylammonium hydroxide, 3-butene-1-ammonium salts and the family of ammonium salts with positive charge and at least one vinyl group, or mixtures of such monomers, or mixtures with conventional non-charged monomers, if appropriate. The use of phosphonium salts with vinyl groups as well as vinylimidazolium salts are potentially suitable monomers as well. In particular chloride salts are applicable.

In particular, said film layer (F) is grafted on the substrate layer (S) by a method, comprising (1) contacting said at least one substrate layer (S) with an aqueous solution containing at least one positively charged polymerizable monomer having at least one polymerizable vinyl group (C=C—) as defined above, preferably contained in said aqueous solution in a concentration of 0.5 to 5 M, preferably for a period of time in the range of 1 to 30 minute;

(2) removing excessive monomer solution; and (3) subjecting the thus prepared, wetted substrate layer (S) to UV radiation, preferably for a period of time in the range of 1 to 60 minutes, wherein the wetted substrate layer (S) may be sandwiched between two layers of quartz slides.

Prior to this, it may be of advantage that the monomer solutions were purged with purified nitrogen in order to remove oxygen in the monomer solution so that the UV reaction only occurs on the free radicals and to avoid unwanted side reaction.

The substrate soaked with monomer solution may be sandwiched in between two pieces of quartz slides (Lanno Quartz, China) and placed at a distance of 2 cm from the UV bulb of the UV-crosslinker and then an UV exposure of sufficient duration is performed. Finally, the modified membranes were carefully rinsed with deionized (DI) water to remove excess monomers.

Other techniques are disclosed, for example in the work by Pieracci et al. [12] and Seman et al. [16].

EXPERIMENTAL PART

Example 1

Preparation of Membrane Substrate Polymers a) sPPSU 2.5%.

In a 4 l HWS-vessel with stirrer, Dean-Stark-trap, nitrogen-inlet and temperature control, 1.99 mol Dichlorodiphenylsulfone (DCDPS), 2.00 mol 4,4'-Dihydroxybiphenyl (DHBP), 0.05 mol 3,3'-Di-sodiumdisulfate-4,4'-dichlorodiphenylsulfone und 2.12 mol Potassium carbonate (Particle size 36.2 µm) are suspended under nitrogen atmosphere in 2000 ml NMP. Under stirring the mixture is heated up to 190° C. 30 l/h nitrogen is purged through the mixture and the mixture is kept at 190° C. for 6 h. After that time 1000 ml NMP are added to cool down the mixture. Under nitrogen the mixture is allowed to cool down below 60° C. After filtration the mixture is precipitated in water which contains 100 ml 2 m HCl. The precipitated product is extracted with hot water (20 h at 85° C.) and dried at 120° C. for 24 h under reduced pressure.

Viscosity number: 88.7 ml/g (1 wt.-/vol % solution in N-methylpyrrolidone at 25° C.).

The content of the sDCDPS monomer was estimated taking the S-content of the polymer to be 2.4 mol-%.

b) sPPSU 5%

In a 4 l HWS-vessel with stirrer, Dean-Stark-trap, nitrogen-inlet and temperature control, 1.90 mol Dichlorodiphenylsulfone (DCDPS), 2.00 mol 4,4'-Dihydroxybiphenyl (DHBP), 0.1 mol 3,3'-Di-sodiumdisulfate-4,4'-dichlorodiphenylsulfone (sDCDPS) und 2.12 mol Potassium carbonate (Particle size 36.2 µm) are suspended under nitrogen atmosphere in 2000 ml NMP. Under stirring the mixture is heated up to 190° C. 30 l/h nitrogen is purged through the mixture and the mixture is kept at 190° C. for 6 h. After that time 1000 ml NMP are added to cool down the mixture. Under nitrogen the mixture is allowed to cool down below 60° C. After filtration the mixture is precipitated in water which contains 100 ml 2 m HCl. The precipitated product is extracted with hot water (20 h at 85° C.) and dried at 120° C. for 24 h under reduced pressure.

Viscosity number: 83.2 ml/g (1 wt.-/vol % solution in N-methylpyrrolidone at 25° C.).

The content of the sDCDPS monomer was estimated taking the S-content of the polymer to be 4.7 mol-%.

Example 2

Fabrication of the Macrovoid Free and Hydrophilic Membrane Substrate from sPPSU 2.5%

The sPPSU 2.5% polymer as prepared according to Example 1a) was first dried at 60° C. under vacuum overnight prior to use. A homogeneous dope solution with composition of sPPSU 2.5%/ethylene glycol/N-methyl pyrrolidone (NMP>99.5%) (20/16/64 wt %) was prepared for membrane substrate fabrications. The polymer solution was then cast on a glass plate using a 250 μm casting knife, followed by immediate immersion in a tap water coagulant bath at room temperature. The as-cast membranes were soaked in water for at least 2 days with constant change of water to ensure complete removal of solvent.

Figure 1:
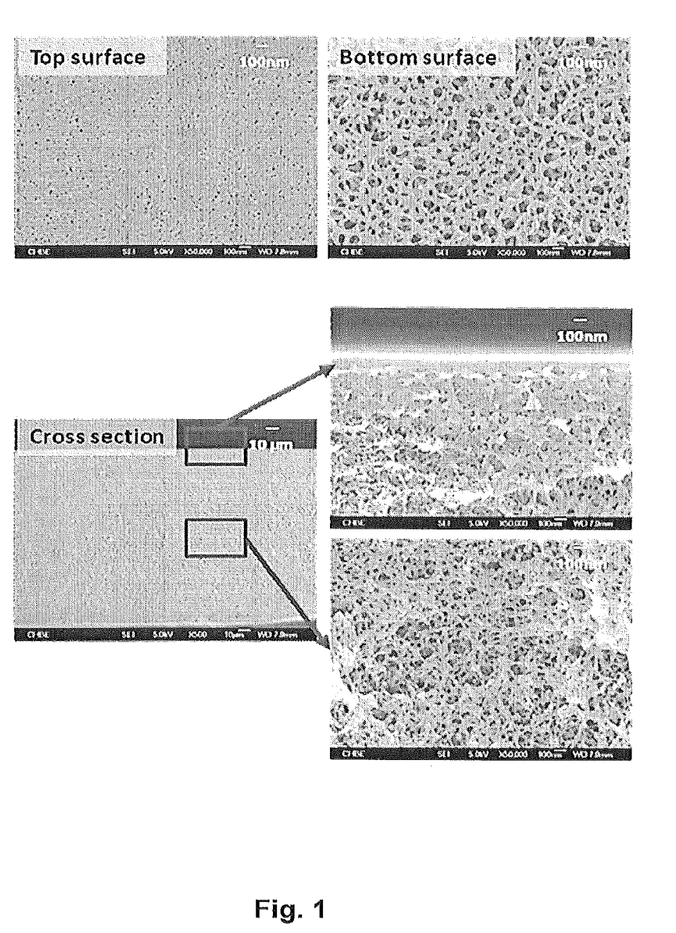
FIG. 1 shows the morphology of a NF membrane substrate as prepared according to the invention.

FIG. 1 shows the morphology of the NF membrane substrate. It can be observed from the cross-section that the membrane substrate exhibits a sponge-like structure with no macrovoids. The use of sulphonated material allows provision of macrovoid free structure due to delayed demixing. The top surface morphology shows pore sizes within the nanometer scale while the bottom surface shows a fully porous structure. In addition, the membrane substrate has pure water permeability of 140 l/m²barh and molecular weight cut off (MWCO) of 92972 g/mol.

Example 3

UV Grafting of Positively Charged Monomers on the Hydrophilic and Macrovoid Free Membrane Substrate

[2-(methacryloyloxy)ethyl]trimethyl ammonium chloride (monomer A) and diallyldimethylammonium chloride (monomer B) were used as the modification agents. NF membranes fabricated using monomer A will be denoted as NF1 while that fabricated using monomer B will be denoted as NF2 hereinafter.

Figure 2A:
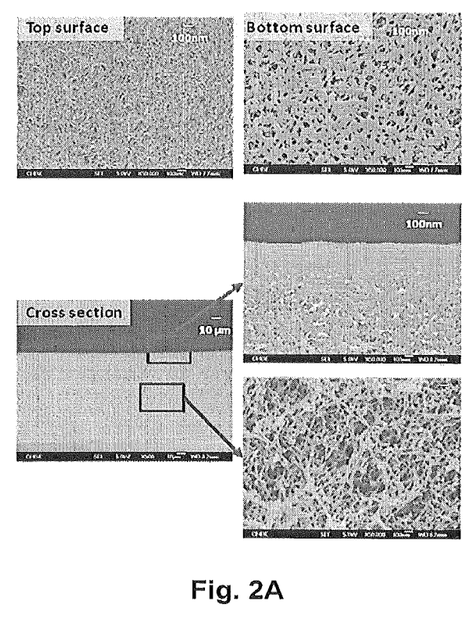
FIG. 2A shows FESEM images of typical NF membranes of the present invention: NF1.
Figure 2B:
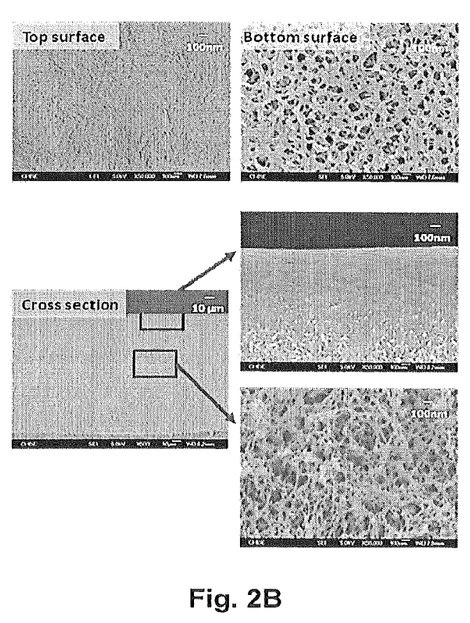
FIG. 2B shows FESEM images of typical NF membranes of the present invention: NF2.

The sPPSU 2.5% supports were washed thoroughly in the deionised water before use. The substrates were gently blotted dry with filter paper and soaked in the monomer solutions for 15 minutes. Prior to this, the monomer solutions were purged with purified nitrogen. The purpose of purging with purified nitrogen was to remove oxygen in the monomer solution so that the UV reaction would only occur on the free radicals, not on the oxygen (i.e., unwanted side reaction). Subsequently, excess monomer solutions were blotted dry from the surface using filter paper. The substrate was sandwiched in between two pieces of quartz slides (Lanno Quartz, China) and placed at a distance of 2 cm from the UV bulb ($\lambda$=254 nm, BLX-312 5×8 w) of the UV-crosslinker purchased from Vilber Lourmat Corporation (Marne-la-vallée Cedex1, France). NF1 membranes were fabricated using 30 minutes while NF2 was subjected to UV exposure for 6 minutes. Finally, the modified membranes were carefully rinsed with deionized (DI) water to remove excess monomers and stored in DI water prior to testing. FIGS. 2a and b show the morphology of the NF1 and NF2 membranes and a clear selective layer can be observed on these membranes.

Example 4

NF Performance Testing of NF1 and NF2 Membranes

NF experiments were conducted in a home-made stirred dead-end filtration cell. The active membrane surface area has a diameter of 35 mm.

Before testing, the membranes were conditioned at 5 bar for 0.5 h. Then, each membrane sample was subjected to the pure water permeation experiment at 5 bar to measure the PWP (L/(m²·*bar*h)), which was calculated using the following equation:

$$PWP = \frac{Q}{A \cdot \Delta P} \quad (1)$$

where Q is the water permeation volumetric flow rate (L/h), A is the effective filtration area (m²), and $\Delta P$ is the trans-membrane pressure (bar).

The support and membranes were characterized by solute separation experiments with (1) various salt solutions at 200 ppm to study charge properties of the membranes and (2) dye solutions at 50 ppm. The different solutions containing neutral solutes and inorganic salts were introduced to the permeation cell and allowed to circulate for 0.5 h before the feed and permeate were collected.

Concentrations of the neutral solute solutions were measured with a total organic carbon analyzer (TOC ASI-5000A, Shimazu, Japan), while those of single electrolyte solutions were measured with an electric conductivity meter (Metrohm, Singapore). The Safranin O and Orange II concentrations were determined by a UV-VIS spectrometer (Bio-Chrom, LibraS32). The rejection, R (%) was calculated using the equation:

$$R = \left(1 - \frac{C_p}{C_f}\right) \times 100\% \quad (2)$$

$C_p$ and $C_f$ are the concentrations of the permeate and feed solutions, respectively.

TABLE 1

PWP and MgCl2 rejection of NF1 and NF2 membranes

| ID | PWP (L/m²*h*bar) | MgCl$_2$ rejection (%) |
|---|---|---|
| NF1 | 14.15 | 92.76 |
| NF2 | 9.20 | 95.20 |

Figure 3:
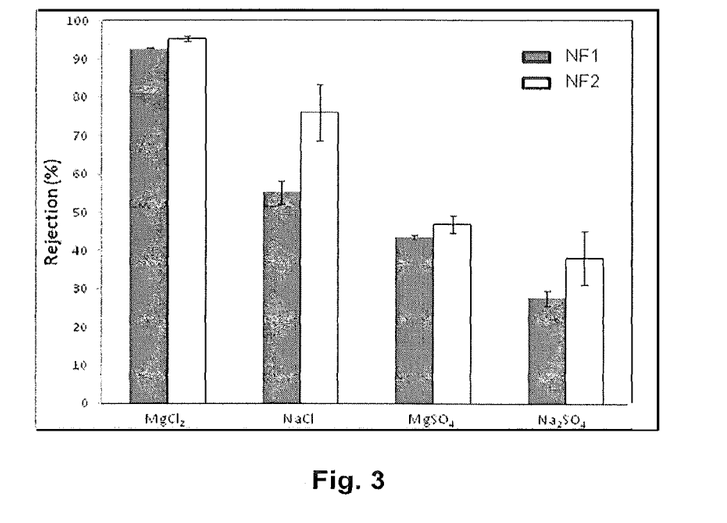
FIG. 3 shows the experimental results as observed for rejections of various electrolyte solutions by the NF1 and NF2 membranes.

Table 1 and FIG. 3 illustrate the PWP and separation performance of NF1 and NF2 membranes with various electrolyte solutions. It can be found that the PWP of NF1 is about 14 LMHbar$^{-1}$ with a MgCl$_2$ rejection of 92.76% while the PWP of NF2 is 9 LMHbar$^{-1}$ with a MgCl$_2$ rejection of 95.20%. The membranes also show rejection following the order of R(MgCl$_2$)>R(NaCl)>R(MgSO$_4$)>R(Na$_2$SO$_4$) which is typical of a positively charged membrane.

Example 5

Dye Rejection Performance of NF1 and NF2 Membranes

Dye solutions (of Safranin O and Orange II; dye concentration 50 ppm) were prepared. The solutions were introduced to the permeation cell and allowed to circulate for 0.5 h before the feed and permeate were collected. The Safranin O and Orange II concentrations were determined by a UV-VIS spectrometer (BioChrom, LibraS32). The rejection, R (%) was calculated using the equation (2).

Figure 4:
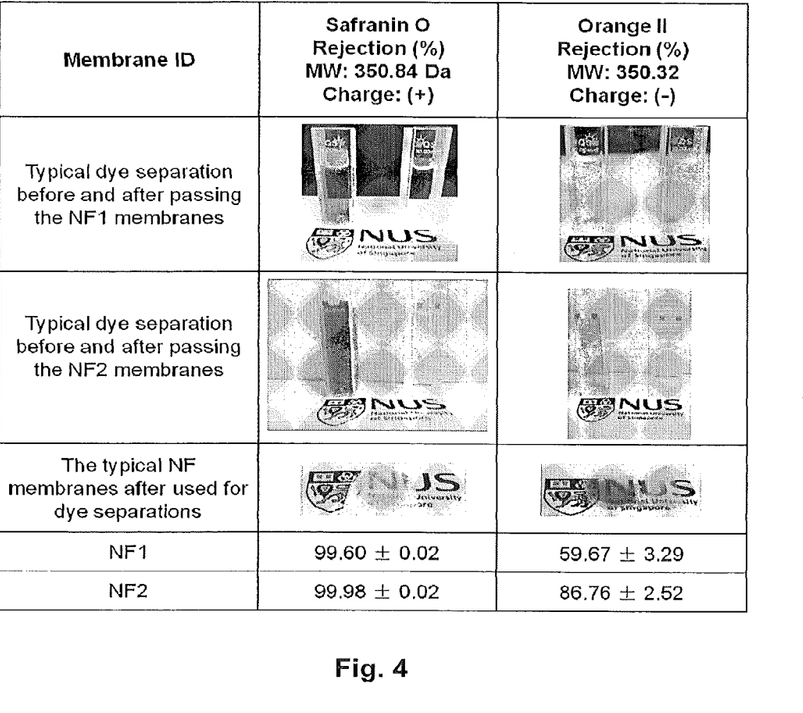
FIG. 4 illustrates the dye rejection performance of NF1 and NF2 membranes.

FIG. 4 summarizes the rejection of the 2 different dyes. It can be seen that both NF1 and NF2 membranes show impressive rejections to the Safranin O dye.

LIST OF REFERENCES

[1] B. Van Der Bruggen, C. Vandecasteele, T. Van Gestel, W. Doyen, R. Leysen, A review of pressure-driven membrane processes in wastewater treatment and drinking water production, Environmental Progress, 22 (2003) 46-56.

[2] X.-L. Li, L.-P. Zhu, Y.-Y. Xu, Z. Yi, B.-K. Zhu, A novel positively charged nanofiltration membrane prepared from N,N-dimethylaminoethyl methacrylate by quaternization cross-linking, Journal of Membrane Science, 374 (2011) 33-42.

[3] N. Hilal, H. Al-Zoubi, N. A. Darwish, A. W. Mohamma, M. Abu Arabi, A comprehensive review of nanofiltration membranes: Treatment, pretreatment, modeling, and atomic force microscopy, Desalination, 170 (2004) 281-308.

[4] M. Mulder, Basic Principles of Membrane Technology, 2nd Ed., Kluwer Academic Publishers, Netherlands, 1996

[5] R. Huang, G. Chen, B. Yang, C. Gao, Positively charged composite nanofiltration membrane from quaternized chitosan by toluene diisocyanate cross-linking, Separation and Purification Technology, 61 (2008) 424-429.

[6] T. K. Dey, R. C. Bindal, S. Prabhakar, P. K. Tewari, Development, Characterization and Performance Evaluation of Positively-Charged Thin Film-Composite Nanofiltration Membrane Containing Fixed Quaternary Ammonium Moieties, Separation Science and Technology, 46 (2011) 933-943.

[7] L. Ouyang, R. Malaisamy, M. L. Bruening, Multilayer polyelectrolyte films as nanofiltration membranes for separating monovalent and divalent cations, Journal of Membrane Science, 310 (2008) 76-84.

[8] B. W. Stanton, J. J. Harris, M. D. Miller, M. L. Bruening, Ultrathin, Multilayered Polyelectrolyte Films as Nanofiltration Membranes, Langmuir, 19 (2003) 7038-7042.

[9] R. Huang, G. Chen, B. Yang, C. Gao, Positively charged composite nanofiltration membrane from quaternized chitosan by toluene diisocyanate cross-linking, Separation and Purification Technology, 61 (2008) 424-429.

[10] S. Béquet, J.-C. Remigy, J.-C. Rouch, J.-M. Espenan, M. Clifton, P. Aptel, From ultrafiltration to nanofiltration hollow fiber membranes: a continuous UV-photografting process, Desalination, 144 (2002) 9-14.

[11] M. Ulbricht, H.-H. Schwarz, Novel high performance photo-graft composite membranes for separation of organic liquids by pervaporation, Journal of Membrane Science, 136 (1997) 25-33.

[12] J. Pieracci, D. W. Wood, J. V. Crivello, G. Belfort, UV-Assisted Graft Polymerization of N-vinyl-2-pyrrolidinone onto Poly(ether sulfone) Ultrafiltration Membranes: Comparison of Dip versus Immersion Modification Techniques, Chemistry of Materials, 12 (2000) 2123-2133.

[13] H. Yamagishi, J. V. Crivello, G. Belfort, Development of a novel photochemical technique for modifying poly(arylsulfone) ultrafiltration membranes, Journal of Membrane Science, 105 (1995) 237-247.

[14] K. Y. Wang, T.-S. Chung, The characterization of flat composite nanofiltration membranes and their applications in the separation of Cephalexin, Journal of Membrane Science, 247 (2005) 37-50.

[15] A. Santafé-Moros, J. M. Gozálvez-Zafrilla, J. Lora-Garcia, Performance of commercial nanofiltration membranes in the removal of nitrate ions, Desalination, 185 (2005) 281-287.

[16] M. N. Abu Seman, M. Khayet, Z. I. Bin Ali, N. Hilal, Reduction of nanofiltration membrane fouling by UV-initiated graft polymerization technique, Journal of Membrane Science, 355 (2010) 133-1.41.

[17] M C Porter et al. in Handbook of Industrial Membrane Technology (William Andrew Publishing/Noyes, 1990)

[18] R. N. Johnson et al., J. Polym. Sci. A-1, Vol. 5, 2375 (1967).

[19] Harrison et al, Polymer preprints (2000) 41 (2) 1239).

[20] M. Ueda et al., J. Polym. Sci., Part A: Polym. Chem. Vol. 31 853 (1993).

[21] Geise, G. M., et al J. Poly. Sci, Part B: Polym Phys.: Vol 48, (2010), 1685

[22] C. A. Smolders et al J. Membr. Sci.: Vol 73, (1992), 259.

The disclosure of herein cited documents is incorporated by reference

The invention claimed is:

1. A nanofiltration membrane comprising
   a) at least one substrate layer (S) comprising at least one partially sulfonated polyethersulfone polymer (P1), wherein 0.5 to 5 mol % of the monomeric constituents (or repeating units) of said polyethersulfone polymer (P1) are sulfonated, and
   b) at least one film layer (F) grafted on said at least one substrate layer (S), the at least one film layer (F) comprising at least one cationic polymer (P2).

2. The nanofiltration membrane of claim 1, wherein said partially sulfonated polyethersulfone polymer (P1) is a polyarylenethersulfone polymer and is composed of monomeric units of the general formulae wherein
Ar represents a divalent arylene residue, at least one monomeric unit selected from M1 and M2 is sulphonated, and the aromatic rings as contained in M1 and M2 optionally and independently of each other is optionally further substituted.

3. The nanofiltration membrane of claim 1, wherein said partially sulfonated polyethersulfone polymer (P1) is obtained by
   a) polymerizing monomers of the general formulae M1a and M2a (M1a)

(M2a)

wherein
Ar represents a divalent arylene residue, and Hal is F, Cl, Br or I, followed by sulphonating the obtained polymer; or b) polymerizing monomers of the general formulae M1a and M2a and at least one sulphonated monomer of the general formulae M1b and M2b (M1b)

(M2b)

wherein Hal and Ar are as defined above, and n and m independently are 0, 1 or 2, provided that n and m are not simultaneously 0.

4. The nanofiltration membrane of claim 1, wherein said partially sulfonated polyethersulfone polymer (P1) comprises a non-sulfonated repeating unit of formula (1)

(1)

and a sulfonated repeating unit of formula (2)

(2)

5. The nanofiltration membrane of claim 4, wherein said sulfonated repeating unit is contained in a molar ratio of 0.1 to 20 mol-% based on the total mole number of repeating units (1) and (2).

6. The nanofiltration membrane of claim 4, wherein said sulfonated repeating unit is contained in a molar ratio of 0.5 to 5 mol-% based on the total mole number of repeating units (1) and (2).

7. The nanofiltration membrane of claim 1, wherein the cationic polymer (P2) is prepared from monomer constituents, comprising a positively charged monomer, selected from the group consisting of [2-(acryloyloxy)ethyl]trimethyl ammonium salts, [3-(methacryloylamino)propyl]trimethylammonium salts, [3-acrylamidopropyl]-trimethylammonium salts, trimethylvinylammonium hydroxide, 3-butene-1-ammonium salts, the family of ammonium salts with at least one vinyl group, the family of phosphonium salts with at least one vinyl group and vinylimidazolium salts.

8. The nanofiltration membrane of claim 1, wherein said polymer (P1) has a Mw in the range of 50,000 to 150,000 g/mol, as determined by Gel Permeation Chromatography (GPC) in N-dimethylacetamide (DMAc) and/or
wherein said polymer (P2) has a Mw in the range of 40,000 to 150,000 g/mol, as determined by GPC in DMAc.

9. The nanofiltration membrane of claim 1, wherein said polymer (P1) has a Mw in the range of 70,000 to 100,000 g/mol, as determined by Gel Permeation Chromatography (GPC) in N-dimethylacetamide (DMAc), and/or
wherein said polymer (P2) has a Mw in the range of 60,000 to 130,000 g/mol, as determined by GPC in DMAc.

10. A method of preparing the nanofiltration membrane of claim 1, which method comprises
providing at least one substrate layer (S) comprising at least one partially sulfonated polyethersulfone polymer (P1), wherein 0.5 to 5 mol % of the monomeric constituents (or repeating units) of said polyethersulfone polymer (P1) are sulfonated, and
grafting at least one film layer (F) on said at least one substrate layer (S), the at least one film layer (F) comprising at least one cationic polymer (P2).

11. The method of claim 10, wherein grafting is performed by a method, comprising
b1) contacting said at least one substrate layer (S) with an aqueous solution containing at least one positively charged polymerizable monomer having at least one vinyl group, contained in said aqueous solution in a concentration of 0.5 to 5 M;
b2) removing excessive monomer solution; and
b3) subjecting the thus prepared, wetted substrate layer (S) to UV radiation.

12. The method of claim 10, wherein grafting is performed by a method, comprising
b1) contacting said at least one substrate layer (S) with an aqueous solution containing at least one positively charged polymerizable monomer having at least one vinyl group, contained in said aqueous solution in a concentration of 0.5 to 5 M, for a period of time in the range of 1 to 30 minutes;
b2) removing excessive monomer solution; and
b3) subjecting the thus prepared, wetted substrate layer (S) to UV radiation for a period of time in the range of 1 to 60 minutes.

13. The method of anyone of claim 10, wherein the at least one substrate layer (S) is prepared by applying a polymer solution comprising at least one partially sulphonated polyethersulfone polymer (P1) as defined in claim 1.

14. The method of claim 10, wherein the polymer content of said solution is in the range of 10 to 24 wt.-%.

15. The method of claim 14, wherein the polymer solution contains at least one solvent and wherein the solvent is N-methylpyrrolidone (NMP), N-dimethylacetamide (DMAc), dimethylsulfoxide (DMSO), dimethylformamide (DMF), triethylphosphate, tetrahydrofuran (THF), 1,4-dioxane, methyl ethyl ketone (MEK), or a combination thereof; and, additionally may contain at least one further additive and wherein the further additive is ethylene glycol, diethylene glycol, polyethylene glycol, glycerol, methanol, ethanol, isopropanol, polyvinylpyrrolidone, or a combination thereof, wherein said additive is contained in said polymer solution in a range of 0-30 wt.-% per total weight of the polymer solution.

16. A nanofiltration membrane comprising at least one nanofiltration membrane prepared according to claim 7.

17. The nanofiltration membrane of claim 8, wherein the film layer (F) grafted on the substrate layer (S) has a layer thickness in the range of 150-350 nm, and substrate layer (S) has a layer thicknesses in the range of 50-250 μm.

18. The nanofiltration membrane of claim 9, wherein the film layer (F) grafted on the substrate layer (S) has a layer thickness in the range of 150-350 nm, and substrate layer (S) has a layer thicknesses in the range of 50-250 μm.

19. The nanofiltration membrane of claim 1, wherein 1 to 3.5 mol % of the monomeric constituents (or repeating units) of said polyethersulfone polymer (P1) are sulfonated.

20. The nanofiltration membrane of claim 3, wherein the M2a monomer is 21. A nanofiltration membrane comprising
at least one substrate layer (S) comprising at least one partially sulfonated polyethersulfone polymer (P1), wherein 0.5 to 5 mol % of the monomeric constituents (or repeating units) of said polyethersulfone polymer (P1) are sulfonated, and the partially sulfonated polyethersulfone polymer (P1) comprises a non-sulfonated repeating unit of formula (1)

and a sulfonated repeating unit of formula (2)

and
at least one film layer (F) grafted on the at least one substrate layer (S), the at least one film layer (F) comprising at least one cationic polymer (P2).

* * * * *